United States Patent Office 3,775,410
Patented Nov. 27, 1973

3,775,410
PROCESS FOR PREPARING CEPHALOSPORIN COMPOUNDS
Burton G. Christensen, 2665 Skytop Drive, Scotch Plains, N.J. 07080, and Raymond A. Firestone, 60 Hunter Ave., Fanwood, N.J. 07023
No Drawing. Filed Nov. 29, 1971, Ser. No. 203,053
Int. Cl. C07d 99/16, 99/24
U.S. Cl. 260—243 C
8 Claims

ABSTRACT OF THE DISCLOSURE

A process is provided for preparing 7-acylamino-7-methoxycephalosporins which comprises methylating a 7-acylamino-7-hydroxycephalosporin. The final products have antibacterial activity.

---

This invention relates to a process for preparing a compound having the formula:

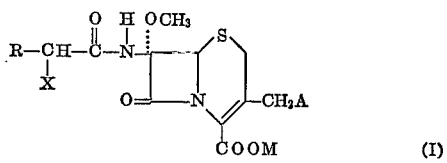

(I)

wherein X is hydrogen, amino, or carboxyl; R is phenyl of a 5-membered heterocyclic ring having 1–2 hetero atoms, the latter being either S, O, or N; A is hydrogen, loweralkanoyloxy, carbamoyloxy, thiocarbamoyloxy, N-loweralkylcarbamoyloxy, N-loweralkylthiocarbamoyloxy, N,N-diloweralkylcarbamoyloxy, N,N-diloweralkyl, thiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

In summary, this invention provides two new routes for methylating a compound of the formula:

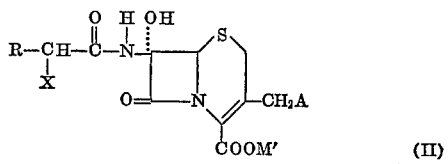

(II)

wherein R, X, and A are as defined above, and M' is benzyl, benzhydryl, trimethylsilyl, trichloroethyl, methoxymethyl, benzoylmethyl, or methoxybenzyl. Each route will be separately discussed below.

The first route utilizes a hyper-reactive methylating agent in reaction with Compound II. The term "hyperreacttive methylating agent" is employed to mean a methylating agent which is activated by the addition of a Lewis acid type catalyst. By the term "Lewis acid type catalyst" is meant a chemical compound which will accept an electron-pair and participate in the formation of a coordinate covalent bond. This definition is one widely accepted by those skilled in the art. Included within this definition, for instance, is boron trifluoride, boron trichloride, aluminum trichloride, tin (IV) chloride, titanium (IV) chloride, sulfur tetrafluoride, and others similar in character. Suitable Lewis acids for this invention include fluoroboric acid, boron trifluoride etherate, or aluminum chloride. Other Lewis acids will be known to those skilled in the art. They are prepared in inert solution prior to use and then added to the substrate at the time the methylating agent is added. One suitable methylating agent is diazomethane. The three components are mixed at temperatures ranging from —20° C. to ambient temperature, and preferably at about 0° C. Each of the three reactants (the starting material II, the Lewis acid, and the methylating agent) is employed in approximately eguimolar amounts. The reaction proceeds spontaneously and is completed within 1–10 hours. The exact end point can be monitored using chromatographic techniques.

The second route involves first, the treatment of the intermediate Compound II with a strong base to prepare an activated hydroxy metal salt, followed by reaction with a methylating agent. The strong base is preferably an inorganic base, such as sodium hydride, sodium hydroxide, potassium hydroxide, phenyl lithium, t-butyl lithium, or the like. Most preferably, phenyl lithium, t-butyl lithium, or sodium hydride is used, preparing, respectively, the lithium or sodium salts. The activated salt intermediate is not isolated, but the methylating agent added directly to the reaction mixture. Suitable methylating agents include methyl sulfate, methyl halide, such as methyl iodide, methyl bromide, or methyl chloride, methyl trifluoromethyl sulfonate, trimethyl oxonium trinitrobenzene sulfonate, mesityl dimethoxy carbonium tetrafluoroborate, tetramethoxyphosphonium tetrafluoroborate, dimethyl iodonium hexafluoroantimonate, dimethyl chloronium hexafluoro-antimonate, or dimethyl bromonium hexafluoroantimonate.

Each of the three reactants (the starting material II, the Lewis acid, and the methylating agent) is employed in approximately equimolar amounts. The reaction is conducted at low temperatures, preferably between —80° C. to 10° C., and most preferably at about —20° C. to 0° C. For safety, the reaction is conducted in an inert atmosphere, such as nitrogen gas.

The reaction is completed within 30 minutes to ten hours, and the exact end point is determined using chromatographic techniques.

The starting material, an ester of 7β-acylamino-7α-hydroxy-3-substituted methyldecephalosporanic acid, can be prepared using a number of methods; one suitable route starts from a 7-aminocephalosporin followed by reaction to hydroxylate, then by acylation using a suitable substituted acetyl halide. The exact preparative route is given below in the specification.

The final products, the esters or free acids of 7β-acylamino-7α-methoxy-3-substituted methyldecephalosporanic acid are useful as antibacterial agents against both gram-positive and gram-negative bacteria. In addition, resistance to β-lactamases has been demonstrated. The activity spectrum includes effectiveness against many bacteria, including in vivo on *Proteus morganii*, and in addition, against *E. coli*, *P. vulgaris*, *P. mirabilis*, *S. schottmuelleri*, *K. pneumoniae* AD, *K. pneumoniae* B, and *P. arizoniae*.

In addition to the specific end product as defined in structural Formula I, other compounds which are active antibacterials can also be prepared using the process described herein. The compounds which can be prepared have the following structural formula:

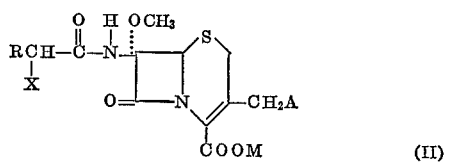

(II)

It is noted that the analogous Δ²-compounds can also be prepared using the processes described herein; these are valuable intermediate compounds because of their greater acid stability and can be converted to the Δ³-compounds easily. One preferred group of substituents are the following: wherein X is hydrogen, halo, amino, guanidino, phosphono, hydroxy, tetrazolyl, carboxyl, sulfo, or sulfamino;

R is phenyl, substituted phenyl, a monocyclic heterocyclic 5- or 6-membered ring containing one or more oxygen, sulfur, or nitrogen atoms in the ring, substituted heterocycles, phenylthio, heterocyclic, or substituted heterocyclic thio-groups, or cyano; the substituents on the R group being halo, carboxymethyl, guanidino, guanidinomethyl, carboxamidomethyl, aminomethyl, nitro, methoxy, or methyl;

A is hydrogen, hydroxy, halo, mercapto, cyano, alkanoyloxy, alkanoylthio, aroyloxy, aroylthio, heteroaryloxy or heteroarylthio, the hetero ring having 5–6 members and having 1–3 hetero atoms, being O, S, or N or combinations thereof, azido, amino, carbamoyloxy, alkoxy, alkylthio, carbamoylthio, thiocarbamoyloxy, benzoyloxy, (p-chlorobenzoyl)oxy, (p-methylbenzoyl) oxy, pivaloyloxy, (1-adamantyl)carboxy, substituted amino such as alkylamino, dialkylamino, alkanoylamino, carbamoylamino, N-(2-chloroethylamino), 5-cyano-triazol-1-yl, 4-methoxycarbonyl-triazol-1-yl, or quaternary ammonium such as pyridinium, 3-methylpyridinium, 4-methylpyridinium, 3-chloropyridinium, 3-bromopyridinium, 3-iodopyridinium, 4-carbamoylpyridinium, 4-(N-hydroxymethylcarbamoyl)pyridinium, 4-(N-carbomethoxycarbamoyl)pyridinium, 4 - (N-cyanocarbamoyl)pyridinium, 4-(carboxymethyl)pyridinium, 4-(hydroxymethyl) pyridinium, 4-(trifluoromethyl)pyridinium, quinolinium, picolinium, or lutidinium; N-loweralkylcarbamoyloxy, N,N-diloweralkylthiocarbamoyloxy, alkanoylcarbamoyloxy, hydroxyphenyl, sulfamoyloxy, alkylsulfonyloxy, or (cis-1,2-epoxypropyl)phosphono; and M is an alkali metal, benzyl, alkanoyloxymethyl, alkylsilyl, phenalkanoyl, benzhydryl, alkoxyalkyl, alkenyl, trichloroethyl, hydrogen, benzoylmethyl, or methoxybenzyl.

Preferably, X is carboxyl, amino, or hydrogen;

R is phenyl, or a 5–6 membered heterocyclic ring having 1–2 heteroatoms, the latter being either S, O, or N;

A is hydrogen, halo, azido, cyano, hydroxy, alkoxy, carbamoyloxy, thiocarbamoyloxy, N - loweralkylcarbamoyloxy, N,N-diloweralkylcarbamoyloxy, N-loweralkylthiocarbamoyloxy, N,N-diloweralkylthiocarbamoyloxy, alkanoyloxy, aroyloxy, mercapto, alkylthio, amino, alkylamino, alkanoylamino, hydroxyphenyl, sulfamoyloxy, quaternary ammonium, alkylsulfonyloxy, or (cis-1,2-epoxypropyl)phosphono; and M is alkali metal, benzyl, alkylsilyl, phenalkanoyl, alkoxyalkyl, pivaloyloxymethyl, alkenyl, trichloroethyl, hydrogen, benzoylmethyl, or methoxybenzyl.

Even more preferably, X is hydrogen, amino, or carboxyl; R is phenyl or a 5-membered heterocyclic ring having 1–2 hetero atoms, the latter being either S, O, or N;

A is hydrogen, loweralkanoyloxy, heteroarylthio, carbamoyloxy, thiocarbamoyloxy, N-loweralkylcarbamoyloxy, N-loweralkylthiocarbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzyl, benzhydryl, trimethylsilyl, trichloroethyl, methoxymethyl, hydrogen, benzoylmethyl, or methoxybenzyl.

Still more preferably, X is hydrogen or carboxyl;

R is phenyl, or a 5-membered heterocyclic ring having one O or one S hetero atom;

A is hydrogen, loweralkanoyloxy, carbamoyloxy, N-loweralkylcarbamoyloxy, N,N - diloweralkylcarbamoyloxy, pyridinium, alkylpyridinium, halopyridinium, or aminopyridinium; and M is sodium, potassium, benzhydryl, methoxymethyl or hydrogen;

Most preferably, X is hydrogen or carboxyl;

R is phenyl, thienyl, or furyl;

A is hydrogen, loweralkanoyloxy, carbamoyloxy, or pyridinium; and

M is sodium, potassium, benzhydryl, methoxymethyl, or hydrogen.

In addition, compounds of Formula III above wherein the sulfuration is present as the sulfoxide,

can be prepared in this inventive reaction.

It will also be apparent to one skilled in the art that the inventive reaction of this application can be used to prepare analogous compounds in the penicillin series, viz:

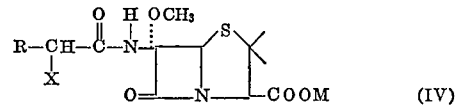 (IV)

wherein R, X, and M are the same as defined in Formula III.

The compounds of Formula III can generally be prepared from 7-ACA or known derivatives thereof using the general process outlined in the preparative examples. Using processes described herein, the 7α-hydroxy intermediate is first prepared then the desired 7α-methoxy group substituted pursuant to the inventive processes.

The blocking group on the acid functionality at position-4 of the cephalosporin ring can be removed following any of the reactions of this invention. The removal can be accomplished using methods available to those in the art.

The penicillins of Formula IV can be prepared from 6-APA or known derivatives thereof using procedures analogous to those described for the cephalosporins.

Other starting materials useful in the application of these inventive reactions to prepare the end compounds described herein can be prepared in accordance with known methods, see, e.g., Belgium Pat. 650,444 or U.S. Pat. 3,117,126, or using the following preparations.

The term "loweralkyl" means a carbon chain having 1–6 carbon atoms; when more than one group appears, they can be the same or different. The term "alkyl" means 1–10 carbon atoms, "loweralkanoyl" means 1–6 carbon atoms.

PREPARATION 1

3-hydroxymethyl-7-aminodecephalosporanic acid

The 3-hydroxymethyl-7-aminodecephalosporanic acid is obtained as the lactone by acid hydrolysis of cephalosporin C in accordance with procedures known in this art.

PREPARATION 2

3-pyridiniummethyl-7-aminodecephalosporanic acid

This compound is prepared by treating cephalosporin C with pyridine followed by acid hydrolysis as described in U.S. Pat. 3,117,126.

PREPARATION 3

3-methyl-7-aminodecephalosporanic acid

This compound is prepared from cephalosporin C by catalytic reduction followed by hydrolytic removal of the 5-aminodipoyl side chain as described in U.S. Pat. 3,129,224.

PREPARATION 4

3-chloromethyl-7-aminodecephalosporanic acid

This compound is prepared from the 3-methyl compound by reaction with chlorine gas. The bromomethyl or iodomethyl derivatives can be prepared from the 3-hydroxymethyl compound by reaction with phosporus tribromide or phophorus triiodide, respectively.

The starting materials used in the preparation of the compounds of Formula I can be prepared as follows:

PREPARATION 5

3-carbamoyloxymethyl-7-aminodecephalosporanic acid 7-aminocephalosporanic acid is treated with 5-butoxycarbonylazide to produce the 7β-(t-butoxycarbonyl)

derivative in accordance with known methods. This derivative is then intimately contacted with citrus acetylesterase in aqueous phosphate buffer at pH 6.5–7 for 15 hours and 3-hydroxymethyl-7β-(t-butoxycarbonyl) aminodecephalosporanic acid is recovered from the resulting reaction mixture.

To 0.2 g. of 3-hydroxymethyl-7β-(t-butoxycarbonyl) aminodecephalosporanic acid suspended in 5 ml. of acetonitrile, cooled to 0° C. and maintained under nitrogen atmosphere is added 0.15 ml. of chlorosulfonyl isocyanate. The reaction mixture is stirred for 70 minutes and then evaporated under diminished pressure to dryness. The resulting residue is taken up in 10 ml. of ethylacetate and 10 ml. of 0.1 N phosphate buffer. The pH of the aqueous layer is adjusted to about 1.6 and the mixture stirred for 2½ hours at room temperature. The pH is then adjusted to about 8 with aqueous tripotassium phosphate solution, and the aqueous phase is separated. The organic phase is re-extracted with 10 ml. of phosphate buffer at pH 8. The combined aqueous phase is adjusted to pH 2.1 with hydrochloric acid and extracted twice with ethylacetate. The ethylacetate extractions are dried over sodium sulfate and evaporated under diminished pressure to afford 0.055 g. of residue. This residue is washed with ether to afford 3-carbamoyloxymethyl-7β-(t-butoxycarbonyl) aminodecephalosporanic acid which is recovered as a yellow solid.

3 - carbamoyloxymethyl - 7β - (t-butoxycarbonyl) aminodecephalosporanic acid (0.5 g.) in 3.5 ml. of anisole is stirred with 2 ml. of trifluoroacetic acid at 0° C. for 5 minutes. The resulting reaction mixture is evaporated under reduced pressure to afford 3-carbamoyloxymethyl-7-aminodecephalosporanic acid which is purified further by crystallization from ethyl acetate.

PREPARATION 6

Trimethylsilyl 3-carbamoloxymethyl-7-aminodecephalosporanate

A mixture of 0.5 mg. of 3-carbamoyloxymethyl-7-aminodecephalosporanic acid, 2 ml. of hexamethyldisilazane and 8 ml. of chloroform is stirred overnight at reflux temperature protected from moisture. The solvent and excess hexamethyldisilazane are removed at reduced pressure, leaving a residue containing trimethylsilyl 3-carbamoyloxymethyl-7-aminodecephalosporanate.

PREPARATION 7

Benzhydryl 7β-(2-thienylacetamido)-7α-hydroxy-3-carbamoyloxymethyldecephalosporanate (A) 7-amino-3-carbamoyloxymethyldecephalosporanic acid benzhydryl ester: 272 mg. of 7-amino-3-carbamoyloxymethyldecephalosporanic acid is slurried 5 min. at 25° C. in 7 ml. dioxine with 170 mg. p-toluenesulfonic acid·H₂O. Methanol (2 ml.) is added, the solvents are removed in vacuo, and dioxane is twice added and evaporated in vacuo. Dioxane (8 ml.) is added, and then 290 mg. diphenyldiazomethane. After the evolution of nitrogen is complete, the solvent is distilled in vacuum, and the residue stirred with methylene chloride (10 ml.) and water (10 ml.) containing sufficient K₂HPO₄ to bring the pH to 8. The layers are separated and the aqueous portion extracted twice more with CH₂Cl₂. The combined organic layers are dried with sodium sulfate, filtered and evaporated, leaving oily crystals. Washing with ether affords a dry solid, which is the product, 7-amino - 3 - carbamoyloxymethyldecephalosporanic acid benzhydryl ester.

(B) Benzhydryl 3 - carbamoyloxymethyl-7-(2-thienylacetamido)decephalosporanate: Benzhydryl 7-amino-3-carbamoyloxymethyldecephalosporanate (452 mg.) is reacted with 161 mg. thienylacetyl chloride in 25 ml. methylene chloride containing 0.5 ml. pyridine.

The reaction mixture is held at 0° C. for 15–60 minutes and then raised to room temperature and held an additional 15–60 minutes. The mixture is then washed with water, dilute phosphoric acid (buffered to pH 2), water, and dilute sodium bicarbonate. After drying over MgSO₄, the solution is filtered and evaporated. The crude solid is purified by chromatography on silica gel, and eluted using, for instance, 4:1 chloroform-ethylacetate. The product prepared is the benzhydryl 7-(2-thienylacetamido)-3-carbamoyloxymethyldecephalosporanate.

(C) Benzhydryl 7β-(2-thienylacetamido)-7α-hydroxy-3-carbamoyloxymethyldecephalosporanate: Benzhydryl 7-(2 - thienylacetamido)-3-carbamoyloxymethyldecephalosporanate, 0.106 g. in 5 ml. of tetrahydrofuran is cooled to −78° C. under nitrogen. One equivalent (0.109 ml. of 2.3 M) phenyl lithium is added, followed by 0.060 ml. t-butyl hypochlorite. After one minute at −78° C., a solution of 0.024 ml. t-butyl alcohol and 0.109 ml. of 2.3 M phenyl lithium in 2 ml. tetrahydrofuran is added. The reaction mixture is then removed from the ice bath, stirred, and then 40 ml. benzene containing 0.1 ml. acetic acid added. The solution is washed and purified; the product is identified as benzhydryl 7β-(2-thienylacetamido)-7α-hydroxy - 3 - carbamoyloxymethyldecephalosporanate.

This invention is further illustrated by the following examples.

EXAMPLE 1

Benzhydryl 3-carbamoyloxymethyl-7α-methoxy-7β-(2-thienylacetamido)decephalosporanate Benzhydryl 3 - carbamoyloxymethyl - 7 - hydroxy-7-(2-thienylacetamido)decephalosporanate, 280 mg., is stirred in 10 ml. CH₂Cl₂. A catalyst solution, 0.3 ml. (made in this way: to 19 ml. diethylether in a 25 ml. volumetric flask is added, at 0° C., 0.133 ml. concentrated fluoroboric acid, followed by methylene chloride to the mark), is added, followed by the slow addition of 3.9 ml. 0.45 M diazomethane in methylene chloride. After one hour's additional stirring, one drop of additional catalyst solution is added. The solution is filtered, washed with aqueous bicarbonate water three times, dried over MgSO₄, filtered and evaporated, affording benzhydryl 3-carbamoyloxymethyl - 7α - methoxy-7β-(2-thienylacetamido)decephalosporanate.

Other catalysts that may be used for this reaction are either boron trifluoride-etherate or aluminum chloride, in place of fluoroboric acid.

EXAMPLE 2

Benzhydryl 3-carbamoyloxymethyl-7α-methoxy-7β-(2-thienylacetamido)decephalosporanate (A) Benzhydryl 3-carbamoyloxymethyl-7-hydroxy-7-(2-thienylacetamido)decephalosporanate, 543 mg., is stirred in 10 ml. ethylene dichloride at −40° C. under nitrogen, and converted to its lithium salt by the addition of 0.432 ml. 2.3 M t-butyl lithium. To this solution with stirring at 0° C. is slowly added a solution of mesityl dimethoxycarbonium tetrafluoroborate (280 mg.) in 10 ml. ethylene dichloride, all under nitrogen. After another ten minutes of stirring, the solution is washed three times with water, dried over MgSO₄, filtered and evaporated, affording the crude product admixed with methyl mesitoate. The product, benzhydryl 3-carbamoyloxymethyl-7α-methoxy-7β-(2 - thienylacetamido)decephalosporanate, is purified by chromatography.

(B) Benzhydryl 3-carbamoyloxymethyl - 7α - hydroxy-7β-(2-thienylacetamido)decephalosporanate, 543 mg., is stirred in 10 ml. methylene chloride at −50° C. under nitrogen, and converted to its lithium salt by the addition of 0.435 ml. 2.3 M t-butyl lithium. To this solution at 25° C. with stirring under nitrogen is slowly added a solution of 242 mg. tetramethoxyphosphonium tetrafluoroborate in 10 ml. methylene chloride. The reaction mixture is aged one hour, washed three times with water, dried over MgSO₄, filtered, evaporated and chromatographed to afford pure benzhydryl 3-carbamoyloxymethyl - 7α - methoxy-7β-(2-thienylacetamido)decephalosporanate.

(C) Benzhydryl 3-carbamoyloxymethyl - 7α - hydroxy-7β-(2-thienylacetamido)decephalosporanate, 543 mg. is stirred in 10 ml. methylene chloride at −50° C. under nitrogen, and converted to its lithium salt by the addition of 0.435 ml. 2.3 M t-butyl lithium. The solution is then cooled to −78° C. and, still under nitrogen, 393 mg. dimethyliodonium hexafluoroantimonate is added, in portions. The reaction temperature is slowly brought up to −20° C., and the mixture is then pumped at 0.1 mm. to remove methyl iodide. The residue is taken up in 25 ml. benzene, washed three times with water, dried over MgSO$_4$, filtered and evaporated to afford the product, benzhydryl 3-carbamoyloxymethyl - 7α - methoxy-7β-(2-thienylacetamido)decephalosporanate, which can be purified by chromatography.

The corresponding dimethyl chloronium and dimethylbromonium salts can be substituted for the dimethyldiodonium salt in this procedure, to yield the same product.

EXAMPLE 3

Benzhydryl 3-carbamoyloxymethyl-7α-methoxy-7β-(2-thienylacetamido)decephalosporanate Benzhydryl 3 - carbamoyloxymethyl-7α-hydroxy-7β-(2-thienylacetamido)decephalosporanate, 543 mg., is stirred in 15 ml. dry DMSO. Sodium hydride, 24 mg. (48 mg. of a 50% suspension of NaH in mineral oil, which has been washed with hexane to remove the oil), is added. When hydrogen evolution has ceased, 126 mg. dimethyl sulfate is added. The solution is stirred for one hour at room temperature, diluted with 100 ml. benzene and washed six times with water; the last wash is made to pH 8, if necessary, by adding sodium bicarbonate. The solution is dried over MgSO$_4$, filtered and evaporated, leaving benzhydryl 3-carbamoyloxymethyl-7β-(2-thienylacetamido)-7α-methoxydecephalosporanate, which may be purified if desired by chromatography on silica gel, eluting with 25:1 chloroform-ethyl acetate.

Other methylating agents may be used in place of methyl sulfate, e.g., an equimolar amount of methyl iodide, bromide or chloride, using the same conditions, or methyl trifluoromethylsulfonate or trimethyloxonium trinitrobenzenesulfonate. The solvent in the latter two reagents is dimethyl ether-HMPA 1:1, using a reaction temperature of −20° C. warming later to 25° C. In each instance, the benzhydryl 3-carbamoyloxymethyl-7β-(2-thienylacetamido) - 7α - methoxydecephalosporanate is obtained.

EXAMPLE 4

3-carbamoyloxymethyl-7α-methoxy-7β-(2-thienylacetamido)decephalosporanic acid

Benzhydryl 3 - carbamoyloxymethyl-7-(2-thienylacetamido)decephalosporanate (300 mg.) in 0.5 ml. in anisole and 2.5 ml. of trifluoroacetic acid is reacted for 15 minutes at 10° C. The resulting mixture is evaporated at reduced pressure and flushed twice with anisole. The residue is dissolved in methylene chloride and extracted with 5% sodium bicarbonate solution. The aqueous solution is adjusted to pH 1.8 with 5% phosphoric acid and extracted with ethyl acetate. The organc solution is dried and evaporated to yield the pure 3-carbamoyloxymethyl-7α-methoxy-7β-(2 - thienylacetamido)decephalosporanic acid, M.P. 165–167° C. UV and NMR analysis provide data consistent with the assigned structure.

EXAMPLE 5

Sodium 3-carbamoyloxymethyl-7α-methoxy-7β-(2-thienylacetamido)decephalosporanate The procedure as in Example 4 is followed, except that the pH is adjusted to 8.0 with dilute sodium hydroxide and concentrated under vacuum to remove the solvents. The mono-sodium salt of 3-carbamoyloxymethyl-7α-methoxy-7β-(2-thienylacetamido)decephalosporanic acid is recovered.

What is claimed is:

1. The process of preparing the compound having the formula:

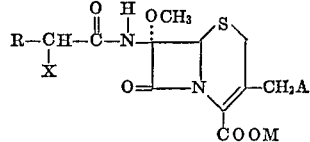

wherein X is hydrogen, amino, or carboxyl; R is phenyl, thienyl or furyl; A is hydrogen, loweralkanoyloxy, carbamoyloxy, thiocarbamoyloxy, N-loweralkylcarbamoyloxy, N-loweralkylthio, carbamoyloxy, N,N-diloweralkylcarbamoyloxy, N,N-diloweralkylthiocarbamoyloxy, pyridinium, alkylpyridinium, halopyridinium, or aminopyridinium; and M is sodium, potassium, benzhydryl, trimethylsilyl, trichloroethyl, methoxymethyl, hydrogen, benzoylmethyl, or methoxybenzyl;

which comprises reacting a compound of the formula:

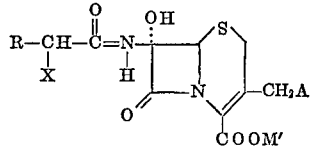

wherein R, X, and A are the same as above, and M' is benzhydryl, trimethylsilyl, trichloroethyl, methoxymethyl, benzoylmethyl or methoxybenzyl;

(a) with approximately equivalent amounts each of diazomethane and a Lewis acid catalyst at a temperature between about −20° C. and ambient, or (b) with about an equivalent amount of a strong inorganic base followed by addition of about an equivalent amount of a methylating agent, at a temperature between about −80° C. to 10° C.;

and then deblocking when M is hydrogen, optionally followed by addition of sodium or potassium hydroxide when M is sodium or potassium.

2. The process of claim 1 in which the Lewis acid catalyst is fluoroboric acid, boron trifluoride etherate, or aluminum chloride.

3. The process of claim 1 in which the strong inorganic base is phenyl lithium, t-butyl lithium, or sodium hydride.

4. The process of claim 1 in which the methylating agent is methyl sulfate, dimethyliodonium hexafluoroantimonate, methyl mesityl dimethoxycarbonium tetrafluoroborate, or tetramethoxyphosphonium tetrafluoroborate.

5. The process of claim 1 in which R is phenyl or thienyl; X is hydrogen or carboxyl; and X is carbamoyloxy, loweralkanoyloxy, or pyridinium.

6. The process of claim 5 in which A is lowercarbamoyloxy or acetoxy.

7. The process of claim 1 in which R is thienyl; X is hydrogen or carboxy; and A is carbamoyloxy.

8. The process of claim 1 in which R is phenyl; X is carboxy; and A is acetoxy.

References Cited

Nagarajan et al., J.A.C.S., pp. 2308–2312, vol. 93:9, May 5, 1971.

NICHOLAS S. RIZZO, Primary Examiner

U.S. Cl. X.R.

260—239.1; 424—246, 271

UNITED STATES PATENT OFFICE
CERTIFICATE OF CORRECTION

Patent No. 3,775,410     Dated November 27, 1973

Inventor(s) Burton G. Christensen et al.

It is certified that error appears in the above-identified patent and that said Letters Patent are hereby corrected as shown below:

Column 1, following the names and addresses of the nventors, insert the following:

-- assignors to Marck & Co., Inc., Rahway, New Jersey, a corporation of New Jersey --.

Signed and sealed this 25th day of June 1974.

SEAL)
.ttest:

:DWARD M.FLETCHER,JR.           C. MARSHALL DANN
.ttesting Officer                Commissioner of Patents

UNITED STATES PATENT OFFICE
CERTIFICATE OF CORRECTION

Patent No. 3,775,410      Dated November 27, 1973

Inventor(s)   Burton G. Christensen & Raymond A. Firestone

It is certified that error appears in the above-identified patent and that said Letters Patent are hereby corrected as shown below:

Claim 5 should read as follows:

"The process of Claim 1 in which R is phenyl or thienyl; X is hydrogen or carboxyl; and A is carbamoyloxy, loweralkanoyloxy, or pyridinium."

Signed and sealed this 27th day of August 1974.

(SEAL)
Attest:

McCOY M. GIBSON, JR.
Attesting Officer

C. MARSHALL DANN
Commissioner of Patents